UNITED STATES PATENT OFFICE.

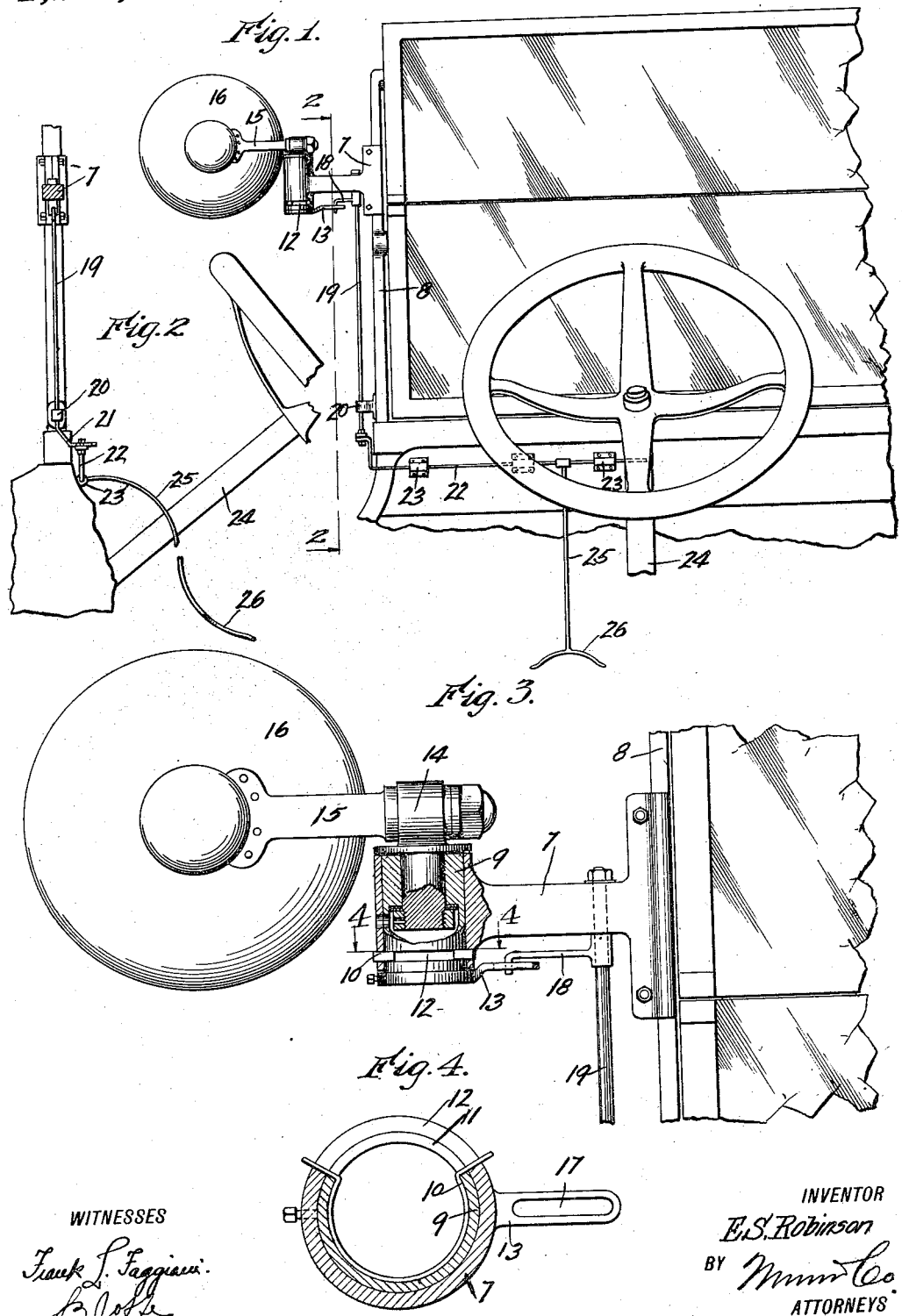

EDWARD SHERMAN ROBINSON, OF SACRAMENTO, CALIFORNIA.

SPOT-LIGHT.

1,290,784.  Specification of Letters Patent.  Patented Jan. 7, 1919.

Application filed December 27, 1917. Serial No. 209,158.

*To all whom it may concern:*

Be it known that I, EDWARD S. ROBINSON, a citizen of the United States, and a resident of Sacramento, in the county of Sacramento and State of California, have invented a new and Improved Spot-Light, of which the following is a full, clear, and exact description.

My invention relates to a spot light for motor vehicles so mounted that the same can be directed at any desired point.

Another object of the invention is to provide a spot light with means for manipulating the same with the knee.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is an elevation of a part of the wind shield of a motor vehicle, the same being provided with a spot light embodying my invention;

Fig. 2, a section on line 2—2, Fig. 1;

Fig. 3, an enlarged rear elevation of the lamp similar to that shown in Fig. 1, a portion of the swivel head being in section to show the details of construction; and Fig. 4, a section on line 4—4, Fig. 3.

Referring to the drawings, 7 is a bracket which extends from a post 8 of the windshield frame. A sleeve 9 is revolubly mounted in the bracket. A spring 10 is provided within the sleeve near the lower end of same, the ends of said spring projecting out of a slot 11 formed in the sleeve. The portion of the bracket accommodating the sleeve has also a slot 12 in register with the slot 11 through which the ends of the spring pass. A portion of the sleeve projects below the bracket and thereat a handle 13 is secured whereby the sleeve may be rotated. In rotating the sleeve either way by means of the handle 13, an end of the spring is entrained by the movement of the sleeve, while the other one is prevented from turning by the engagement of the said end of the spring with the end of the slot formed in the bracket. In consequence, the tendency of the spring is to always return the sleeve to its initial position.

A lamp carrier 14 is secured to the sleeve so as to revolve therewith. The lamp carrier is adapted to receive an arm 15 of a lamp 16. The arm 15 can be turned within the carrier 14 so that the lamp can be placed at any angle to the vertical plane.

The handle 13 has a slot 17 which is engaged by a crank 18 mounted to turn with a shaft 19 which extends alongside the frame 8 and bears in the bracket 7 and also in a bracket 20 provided near the lower end of the frame. The shaft 19 has another crank 21 to which a slide 22 is connected, the slide being mounted in suitable bearings 23 provided on the dashboard in proximity to a steering column 24 of the motor vehicle. An arm 25 extends from the slide 22 and terminates with a fork 26 for engaging the knee, and whereby said slide may be actuated, in consequence causing the turning of the shaft 19 and therewith the turning of the lamp 16. This permits the directing of the light on any desired spot by means of the knee.

From the above description it will be seen that my spot light can be swept to a certain angle by means of the knee and, therefore, directed on any desired spot which is within the angle of the light.

I claim:

1. A spot light for motor vehicles comprising in combination, a bracket adapted to be secured to the frame of a wind shield, a sleeve revolubly mounted in said bracket, a spring carried by said sleeve and engaging said bracket, said spring tending to restore said sleeve to its initial position, a lamp carrier constrained to move with said sleeve, a handle associated with said sleeve, a member mounted to slide and presenting an arm having means for engaging a knee whereby such member may be operated, and motion-transmission means from said handle to said slide.

2. In a spotlight for motor vehicles, a bracket, a sleeve revolubly mounted in said bracket, a lamp carrier constrained to revolve with said sleeve, said sleeve having a slot, said bracket having a slot registering with the slot in the sleeve, a spring in said sleeve having the ends of same projecting out of the slots of the sleeve and bracket, a handle secured to the sleeve to revolve therewith, and means connected to the handle for actuating the same.

3. In a spotlight for motor vehicles, a bracket, a lamp carrier revolubly mounted in the bracket, said carrier having a slot, said bracket having a slot in register with the slot of the carrier, a spring in the carrier having its ends projecting through the slots in the carrier and bracket to engage the ends of the slots, a handle constrained to revolve with the carrier, and means connected to the handle for manipulating the same.

4. In a spotlight for motor vehicles, a bracket, a sleeve revolubly mounted in the bracket, a lamp carrier constrained to revolve with the sleeve, an annular spring in said sleeve having a slot, said bracket having a slot in register with the slot in the sleeve, said spring having the ends of same projecting through the slots and normally engaging the ends of said slots, a handle constrained to revolve with the sleeve, and means connected to the handle for manipulating the same.

EDWARD SHERMAN ROBINSON.